N. M. LA PORTE.
PROCESS OF MAKING CLOSURES.
APPLICATION FILED AUG. 2, 1913.
1,227,160.
Patented May 22, 1917
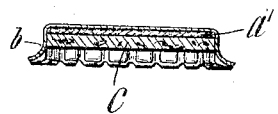
Inventor:
Norbert M. La Porte
by his Attys:

UNITED STATES PATENT OFFICE.

NORBERT M. LA PORTE, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

PROCESS OF MAKING CLOSURES.

1,227,160.      Specification of Letters Patent.      Patented May 22, 1917.

Application filed August 2, 1913. Serial No. 782,573.

*To all whom it may concern:*

Be it known that I, NORBERT M. LA PORTE, a citizen of the United States, residing at Baltimore city, State of Maryland, have invented certain new and useful Improvements in Processes of Making Closures, fully described and represented in the following specification and the accompanying drawings, forming a part of the same.

This invention relates to an improvement in processes for making closures for bottles and the like, and particularly to a process of making closures of that type heretofore known as crown corks.

Closures of the type to which this invention generally relates have usually comprised a metallic shell, a sealing disk, and an intermediate sticking material which is rendered adhesive by heat and set by cooling, as, for instance, a mixture of rosin, copal and paraffin. Usually disks punched from paper impregnated with this adhesive are interposed between the shells and their sealing disks, a sufficient degree of heat being employed in the process of manufacture to soften the sticking material so that it would properly adhere to the shell and the sealing disk. After heating, according to the best practice, the assembled parts of the crown are cooled under a pressure which was maintained until the sticking material had set. As the crowns required time to cool, the speed of production was correspondingly limited.

Closures of the type to which the invention relates are made by automatic machinery in very large quantities and are widely used for bottling liquids which vary widely in their characteristics. Under some circumstances, the liquids bottled or sealed under the closure are liable to work through or around the sealing disk and come in contact with the adhesive. While this is not serious in a large percentage of cases, in some instances, some liquids, particularly beverages, were injuriously affected either in appearance or taste by the adhesive. It has not, however, been possible to select adhesives for particular liquids, as the conditions of manufacture govern the adhesive employed irrespective of the particular use to which the closure is to be put, and the adhesives used or suggested for securing the sealing disk of a closure of the type referred to to its metal shall have injuriously affected some of the liquids or beverages sealed under the closure.

The object of the present invention is to provide a process for the manufacture of closures of the type mentioned which will enable them to be made more rapidly than has heretofore been the case, while at the same time producing a closure having important advantages over those heretofore produced.

In the drawings—

Figure 1 is a sectional view of a crown closure embodying the invention;

Fig. 2 is an enlarged edge view of a carrier of fibrous material prepared in accordance with the invention.

In carrying out the process in its best embodiment, the sealing disk and shell are united by a cementing layer comprising a sticking material which is capable of being set or hardened when subjected to heat, whereby such sticking material, after being rendered adhesive in a suitable manner, may be interposed between the sealing disk and shell, and the whole subjected to pressure and heat in order to set the sticking material and unite the parts firmly.

I have discovered that an albuminous substance is especially adapted for carrying out this improved process. Such an albuminous substance can be prepared so that it may be kept and transported in a dry condition, but is readily rendered adhesive by subjecting it to a cheap and easily-applied solvent, such as water. Further, when subjected to heat, it will set, notwithstanding the presence of the moisture, which is trapped between the shell and sealing disk and cannot well be driven off. Further, the setting, due to the coagulation of the albuminous substance, occurs at a relatively low temperature, namely, about 140° to 160° F. Further, such an albuminous substance when once set or coagulated is insoluble in potable liquids such as are usually packaged under closures of the type to which this invention relates, and is non-fusible, that is to say, it cannot be subsequently softened by the application of ordinary degrees of heat such as would be employed in pasteurization of beers and the like, or degrees somewhat higher.

In carrying out my process in actual practice, it is convenient and highly advantageous to use a cementing layer comprising a carrier of fibrous material, such for example as paper, which is coated on both sides with the said sticking material. In employing an albuminous substance as such sticking material, the latter is dissolved in a suitable solvent, such for example as water, the temperature of the solution being maintained low enough to avoid any danger of coagulating or setting the albumin. I have found that a 5% solution of albumin in water is satisfactory for the purpose intended. The solution may be applied to the fibrous carrier in any suitable way, as for example by passing the carrier through the solution and then drying said carrier. In order to avoid waste of the sticking material, the carrier of fibrous material may be charged with a suitable filler, for which purpose a paraffin is very satisfactory. In the best embodiment of my invention, a carrier of fibrous material, usually paper, is properly charged with a suitable filler and advantageously a filler which is fusible or capable of softening at a temperature at or below that at which albuminous material will coagulate. Such a filler properly applied prevents waste of the sticking material, which may be applied to the filler-charged carrier as a surface coating on each side thereof. If a paraffin is the filler employed, the carrier, such as paper, may be passed through a bath of the melted paraffin so rapidly that the paraffin cannot thoroughly impregnate the paper; the paper charged with paraffin being then passed between scrapers to remove any excess. From a paper prepared as just described, suitable disks may be punched to form a cementing layer arranged to be interposed between the shells and sealing disks of the closures. To render the sticking material adhesive in order to obtain the desired union, a suitable solvent is brought in contact with it. This may be done in various ways. For example, moisture may be applied to the shell and to the sealing disk before the cementing layer is interposed between them. In this case, the sticking material will absorb the moisture from the shell and sealing disk respectively and thereby will be softened and rendered adhesive. Again, the sealing disk may be treated with a highly hygroscopic material such as glycerin, in which case, under some conditions, the moisture from the glycerin in the sealing disk may suffice to moisten the sticking material adjacent to said sealing disk, so that no special step of supplying moisture need be employed. Again, moisture may be applied directly to the cementing layer, as by spraying, by brushes, by rollers, or the like, prior to the insertion of the cementing layer in the shell. Again, the inside of the shells may be supplied with moisture; disks constituting the cementing layers may be placed within said shells and moisture applied to the exterior faces of such disks in a suitable manner, as by spraying, after which the sealing disks are put in place.

After the cementing layer with the sticking material in an adhesive condition is in place between the sealing disk and the shell, and the parts are brought in close contact so as to obtain a good adherence, as for example by the application of pressure to the closure, the sticking material is subjected to heat in order to set or harden the same and thus permanently unite the shell and sealing disk. For the purpose of accomplishing this result, it is advantageous to subject the closure to heat while the parts are still under pressure, such heat being applied in a manner to raise the temperature of the shell which conducts heat to the cementing layer, until finally the sticking material of such cementing layer reaches a point which causes the cementing layer to set. Where the sticking material is an albuminous body, the heat coagulates the albumin and thereby renders it insoluble in potable liquids and incapable of being softened by ordinary degrees of heat, so that whether or not any further increased temperature occurs in carrying out the process or subsequently, is immaterial, provided such temperature is not high enough to cause a decomposition of the sticking material. This characteristic is particularly advantageous where the closures are intended to be used in sealing receptacles containing materials which are to be subsequently subjected to heat, as for example bottled beers which are to be passed through a pasteurizing process, since the heat of pasteurizing cannot soften the sticking material and therefore there is no danger of vapors collecting between the shell and sealing disk.

It has been found in practice that where a carrier, such as paper, is properly charged with a filler, such as paraffin, and the sticking material then applied, a good adhesion is obtained between the shell and the carrier, and the sealing disk and the carrier. This seems to be due to the fact that the paraffin recedes from the surface of the fibrous material, so that the sticking material attaches itself to the fibrous material of the carrier, thus producing a firm union between the shell and the sealing disk.

Hence, with a carrier having its surface charged with a proper filler and its interior porous, the advantage is obtained that the sticking material is applied to a smooth non-absorbent carrier surface and hence waste of sticking material is avoided, while on the other hand, when the closure is completed, the sticking material adheres to the surface of the fibrous material so that it may properly combine therewith.

The drawings show in a conventional way, a carrier of fibrous material such as paper in the form of a strip, at *a*, Fig. 2, prepared in accordance with the instructions hereinbefore set forth. From such a strip disks are punched out and inserted in the crown *b*, Fig. 1, as indicated at *a'*. The cork disk *c* is held to the crown by the adhesion of the carrier, as will be fully understood from the description hereinbefore.

What I claim is:—

1. In the art of making closures comprising a shell and a sealing disk, the process which consists in charging each side of a carrier of fibrous material with a fusible filler while leaving the interior of said carrier porous, coating each side of said charged carrier with a sticking material capable of being set by heat, forming disks from the coated material, subjecting said disks to the action of a solvent of the sticking material, interposing said disks between the shell and sealing disk, and subjecting the sticking material to heat to set it.

2. In the art of making closures comprising a shell and a sealing disk, the process which consists in coating paper with a sticking material comprising an albuminous substance, forming a disk from said paper, subjecting said disk to moisture to render the sticking material adhesive, subjecting the moist-coated paper disk to pressure between a shell and a sealing disk, and subjecting said sticking material to the action of heat to coagulate such albuminous substance.

In testimony whereof, I have hereunto set my hand, in the presence of two subscribing witnesses.

NORBERT M. LA PORTE.

Witnesses:
  H. M. SAITHE,
  E. E. LOVELL.